United States Patent [19]

Petrovich

[11] Patent Number: 5,580,515
[45] Date of Patent: Dec. 3, 1996

[54] CHEMICAL IGNITER FOR AN EXOTHERMIC CUTTING LANCE

[76] Inventor: Paul A. Petrovich, 11269 Judd Rd., Fowlerville, Mich. 48836

[21] Appl. No.: 520,975

[22] Filed: Aug. 22, 1995

[51] Int. Cl.⁶ ..................................................... B23K 7/00
[52] U.S. Cl. ............................................. 266/48; 266/225
[58] Field of Search .................. 266/48, 225; 431/267, 431/269

[56] References Cited

U.S. PATENT DOCUMENTS 4,050,680  9/1977  Sweeny ........................................ 266/48
4,915,618  4/1990  Brandin ...................................... 266/225

FOREIGN PATENT DOCUMENTS 2218933  11/1989  United Kingdom ...................... 266/48

Primary Examiner—Scott Kastler
Attorney, Agent, or Firm—Peter A. Taucher; David L. Kuhn

[57] ABSTRACT

An igniter for an exothermic lance has an inner peripheral wall about the lance, the inner peripheral wall defining dual purpose teeth for centering the lance relative to the igniter and holding various lances of differing diameters. The teeth space the inner wall from the lance so as to form a flue between the inner wall and the lance. Outside the inner peripheral wall and concentric therewith is an outer peripheral wall thicker than the inner wall. A flammable substance is between the inner and outer walls, the flammable substance being more rapidly combustible than the inner wall and outer walls. A match head element at the fore end of the igniter is the mechanism to initiate combustion of the flammable substance, which can be a Thermit mixture. A gap between the match head element and the lance allows oxygen from the lance to enter the flue and accelerate lance ignition.

12 Claims, 2 Drawing Sheets

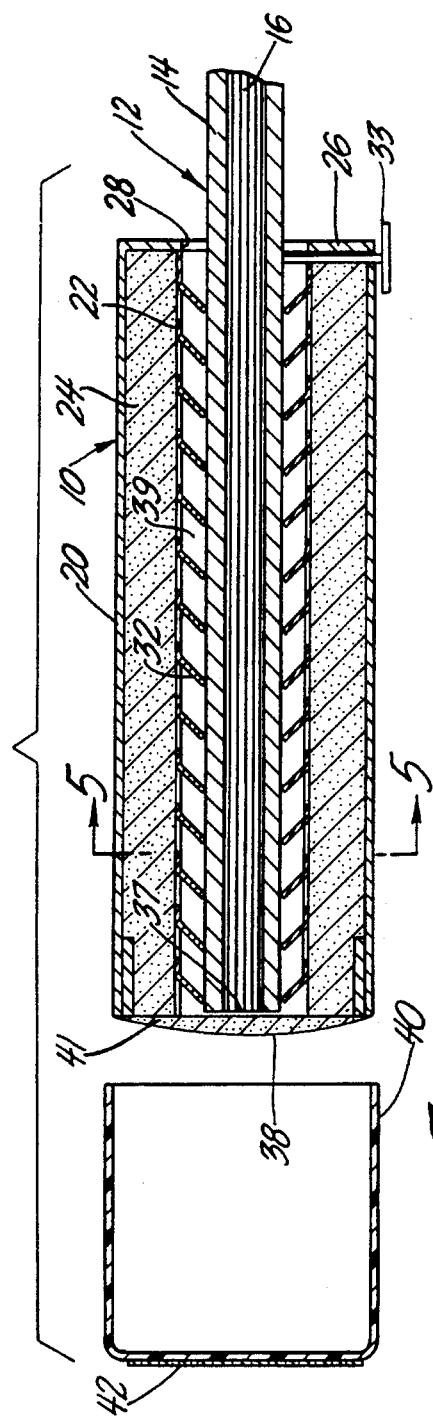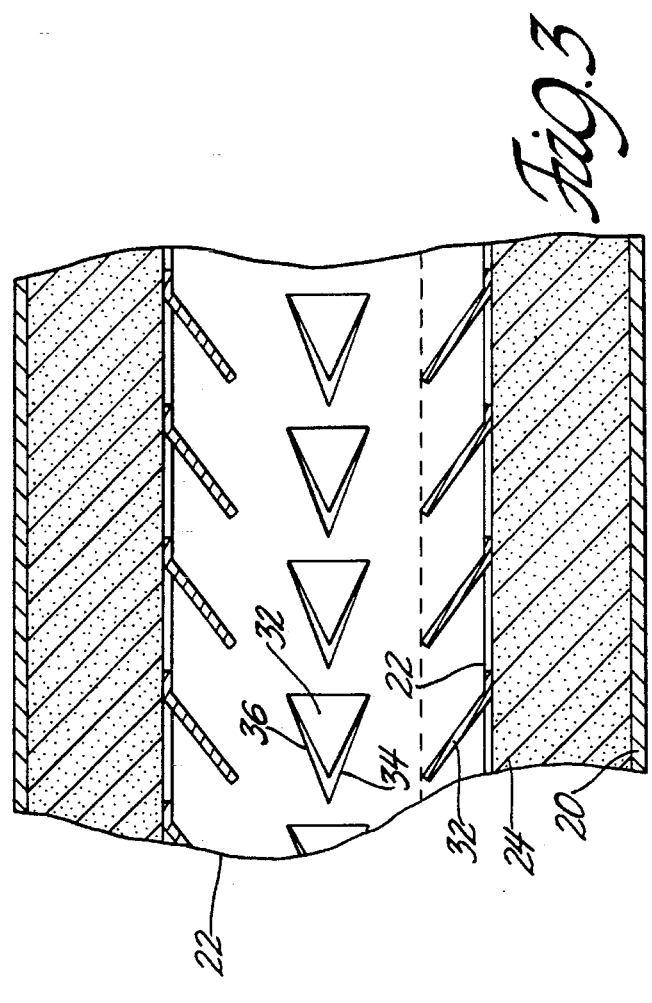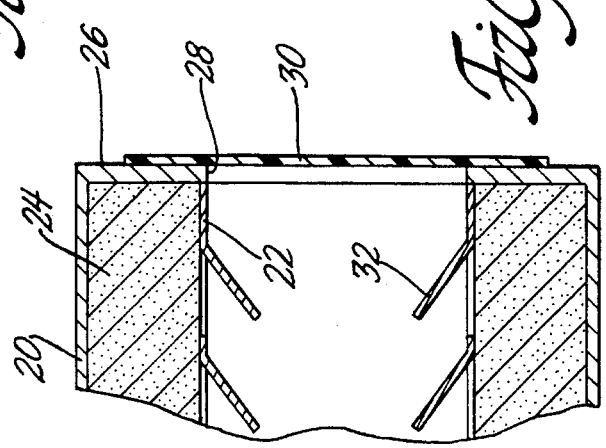

CHEMICAL IGNITER FOR AN EXOTHERMIC CUTTING LANCE

GOVERNMENT USE

The invention described here may be made, used and licensed by or for the U.S. Government for governmental purposes without paying me royalty.

BACKGROUND AND SUMMARY

It is common today to weld or cut metal by using an exothermic oxygen lance, which is a steel pipe filled with rods and having oxygen passing along the rods through the pipe to an ignited end of the pipe. In one method of igniting the pipe, one end of the pipe is heated by an acetylene torch or the like and then oxygen is supplied to the heated end until it begins to burn. Then the acetylene or other gas is shut off. Another method is to connect a 12 volt battery to the lance and strike an arc much like conventional arc welding. In a further method, piezeo-electricity creates an ignition spark, but this method uses an integrated system that requires specialized pipes and compatible holders therefor.

I have invented an oxygen lance igniter that not only obviates the need for acetylene or other gas, a 12 volt battery, or a specialized pipes to start exothermic lance operation. My igniter also permits easier, quicker lance ignition than existing methods. The igniter has an inner wall about the lance, the inner wall defining teeth to center the lance in the igniter and hold lances of differing diameters. The teeth also space the inner wall from the lance to form a flue between the inner wall, and the lance and this flue can receive oxygen during the lance ignition process. Concentrically surrounding the inner wall is an outer wall thicker than the inner wall. A flammable substance, typically a Thermit mixture, is between the inner and outer walls and is more rapidly combustible than the walls. A match head element at one end of the igniter initiates combustion of the flammable substance. A gap between the match head element and the lance allows oxygen from the lance to enter the flue to aid that combustion.

BRIEF DESCRIPTION OF THE DRAWINGS

FIG. 1 is a sectioned side view of my igniter and a safety cap therefore.

FIG. 2 is a detail sectioned view of the aft end of the igniter showing a disk-like sealing cover that is on the aft end before the igniter's use.

FIG. 3 is sectioned detail view of the igniter showing the teeth of the igniter.

DETAILED DESCRIPTION

Figure 7:
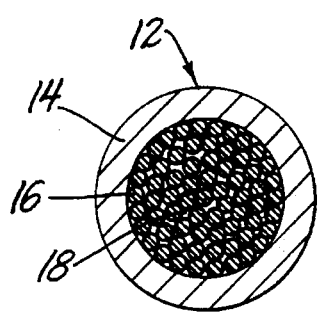
FIG. 7 is a sectional view of an oxygen lance.

FIG. 1 shows an igniter 10 placed on a standard oxygen lance 12, the lance normally comprising a steel pipe 14 and comprising steel or aluminum rods 16 having elongate interstitial spaces 18 (FIG. 7) therebetween. The igniter has a cylindrical outer peripheral wall 20 of aluminum or magnesium that is preferably of 18 to 22 gauge in thickness. Concentric with outer wall 20 is inner peripheral wall 22, which is also made of aluminum or magnesiumbut which preferably has a lesser thickness, normally of 28 to 32 gauge. The outer and inner walls have therebetween an elongate toroidal volume occupied by a mixture 24 of aluminum and ferric oxide which is sold under the trademark "Thermit." Other materials besides a Thermit mixture can be used, such as, for example, the flammable components of signal flares. As will be discussed later, my igniter allows gaseous oxygen to contact mixture 24 during the ignition process. Consequently, mixture 24 actually requires less ferric oxide or other oxygen releasing compound than a typical Thermit mixture.

At the posterior or aft end of igniter 10 is an annular wall 26 that is sealed with inner wall 22 and outer wall 20, the annular wall typically being integrally formed with outer wall 20. Wall 26 defines a aperture 28 through which lance 12 passes when igniter 10 is installed on lance 12, aperture 28 having a greater diameter than lance 12 so that air may enter the posterior end of igniter 10. Until it is time for lance 12 to be inserted into igniter 10, a disk-like cover 30 (FIG. 2) is sealed over aperture 28 to prevent moisture or air from entering the igniter. Cover 30 can be adhered to wall 26 by a thin layer of wax or by any suitable sealant that lightly retains cover 30 on wall 26. Optionally, cover 30 can be a thin sheet of relatively brittle, frangible material that shatters when lance is pushed through it while installing igniter 10 onto lance 12. The shattering of cover 30 will leave aperture 28 essentially clear and open. Also optionally, the posterior end of igniter 10 optionally has a set screw 33 which can help hold lance 12 in igniter 10.

As shown by FIGS. 2 and 3, inner wall 22 has spring-like, flexible tabs or teeth 32 projecting radially inward to grip lance 12. As can be better seen in conjunction with FIG. 3, teeth 32 are formed by first making cuts along edges 34 and 36 and then pushing the resulting tab radially inward, leaving a triangular hole. Teeth 32 may be regarded as punch-outs or partial punch-outs of inner wall 22. Teeth 32 and the corresponding holes need not be triangular, but can be trapezoidal, rectangular or other shapes. Teeth 32 keep lance 12 centered in igniter 10 and their flexibility allows lances of various diameters to fit in igniter 12. Teeth 32 also space lance 12 from inner wall 22 so as to form a flue or air passage 39 therebetween to assist the combustion of lance 12.

At the fore end of igniter 10 is a match head element 38. There is typically a gap 37 between match head element 38 and the fore end of lance 12. This gap allows pressurized oxygen in pipe 14 to enter flue 39 so that combustion of the igniter's elements or lance 12 can be facilitated. The outer peripheral zone 41 of match head element 38 is a means to effect closure for one end of the cylindrical space enclosed by inner wall 22 and outer wall 20. Thus, when element 38 burns away, mixture 24 is exposed to air or possibly oxygen from lance 12, whereby burning of the mixture is facilitated. Also, zone 41 of match head element 38 contacts mixture 24, so that the element's combustion more readily ignites mixture 24.

The material of match head element 38 is a conventional mixture typically comprised of an oxygen carrier such as potassium chromate, a flammable ingredient such as sulfur, frictional additives such as powdered glass and a suitable bonding agent. Match head element 38 is fixed to igniter 10 by any suitable means, including adhesives. Closely fitting over the fore end of igniter 10 is safety cap 40, which keeps match head element 38 from accidentally being struck. Optionally, the fit between cap 40 and igniter 10 is a slightly interfering, sealing fit that keeps air and moisture from match head element 38. On the exterior of cap 40 has a striking surface 42 against which match head element 38 may be struck to ignite that element. The striking surface is typically made of powdered glass, red phosphorus, and binding agents.

In using igniter 10, one first removes cap 40 therefrom and then strikes match head element 38 on surface 42 of the cap. Match head element is thus ignited and in turn ignites mixture 24, whereupon mixture 24 ignites inner wall 22 and outer wall 20. Mixture 24 burns quite rapidly, more rapidly than inner wall 22 or outer wall 20, whereby a void is formed between inner wall 22 and outer wall 20. The void allows air or oxygen in flue 39 to access the burning mixture 24 via holes in inner wall 22, thereby accelerating the burning and heat production of mixture 24. Since outer wall 20 is thicker than inner wall 22, outer wall 20 remains intact longer than inner wall 22. As a result, outer wall 20 inhibits the escape of combustion materials radially outward fran igniter 10, thereby increasing the amount of heat retained at lance 12. Inhibition of the radially outward escape of combustion materials also makes lance 12 and igniter 10 easier and safer to handle during the process of igniting lance 12. When sufficient heat has been generated by the burning of mixture 24, inner wall 22 and outer wall 20, lance 12 will ignite and attain self-sustained combustion. Self-sustained combustion of lance 12 is combustion that requires only the further supply of oxygen through pipe 14 to be maintained and does not need further combustion of mixture 24, inner wall 22 or outer wall 20.

Figure 4:
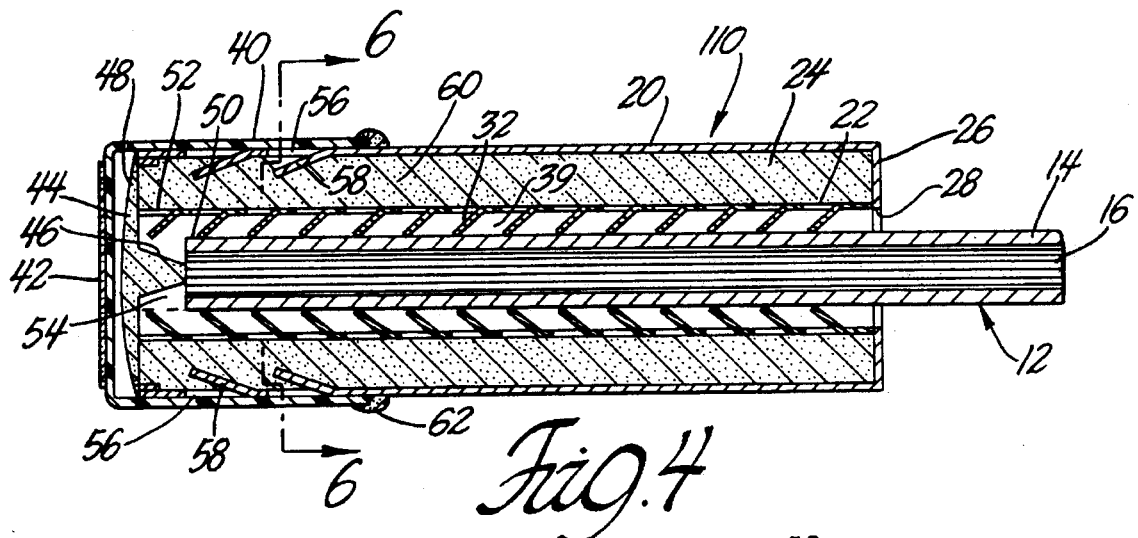
FIG. 4 is a sectioned side view of an alternate embodiment of the igniter.
Figure 5:
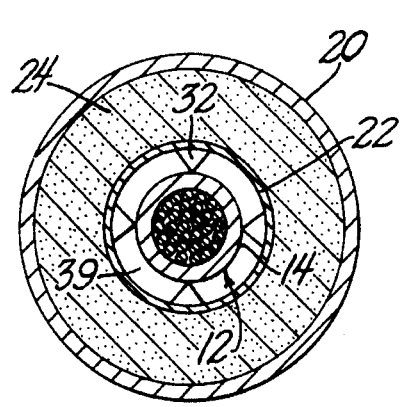
FIG. 5 is a view taken along line 5—5 in FIG. 1.
Figure 6:
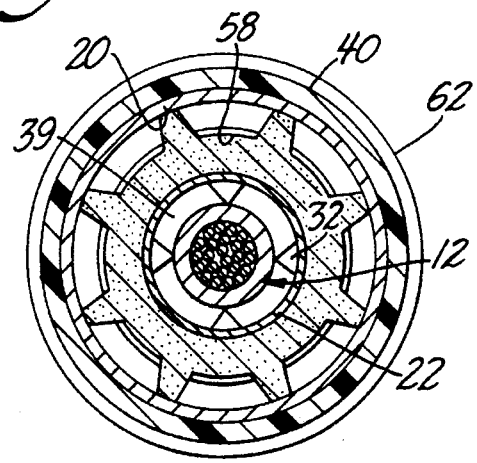
FIG. 6 is a view taken along line 6—6 in FIG. 4.

In FIG. 4 is shown an alternate version 110 of igniter 10, the elements common to both versions of the igniter having the same reference numerals. Igniter 110 has a modified match head element 44 that includes a frustum shaped spacer 46 and a flat portion 48. Spacer 46 keeps the lances's fore end 50 recessed relative to the inner wall's fore end 52, so that an axial void 54 is defined between fore end 50 and flat portion 48 of the match head element. Once match head element 44 has been ignited, pressurized oxygen can be fed through pipe 14 to void 54 to assist with ignition of the lance's fore end 50 and the neighboring portions of inner wall 22, mixture 24 and outer wall 20. It is noted that spacer 46 need not be integral with portion 48 and need not be of the same material as portion 48.

Igniter 110 has louvers in outer wall 20 comprised of louver openings 56 and louver flaps or flanges 58 punched or cut from outer wall 22, the flaps slanting radially inward and forward relative to igniter 110. Once match head element 44 has burned away and mixture 24 has burned rearward past louver openings 56, these openings allow more air to the remainder of mixture 24 that is aft of openings 56, thereby aiding in the combustion of the mixture's remainder. Once mixture 24 has burned rearward past slats 58, say to zone 60, the flaps restrict the expulsion of combustion material out of the fore end igniter 110, which is then open. The flaps direct combustion material radially inward toward lance 12, whereby the ignition of lance 12 is hastened. Note that the louvers are located so that cap 40 will sealingly cover louver openings 56 before the cap is removed from igniter 110. By this arrangement, cap 40 prevents air or moisture from acting on mixture 24 before intended use of igniter 110. An optional annular seal 62 of wax or an elastomeric material disposed at the rim of cap 40 retains cap on igniter 110 and further seals the cap to the igniter.

Figure 8:
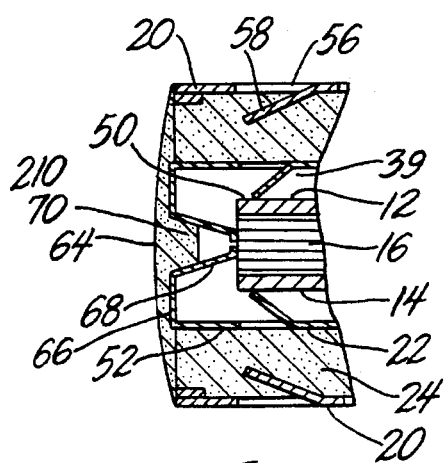
FIG. 8 is is a sectioned partial side view of a third embodiment of the igniter.

FIG. 8 shows a modification 210 to igniter 110 wherein match head element 64 replaces match head element 44 and spacer 46 is replaced by pocket 68 defined by forward wall 66. Forward wall 66, pocket 68 and inner wall 22 can, as shown, be formed from a single piece of sheet metal. A boss 70 of match head element 64 can fit snugly into pocket 68. Once match head element 64 ignites, and until wall 66 burns away, wall 66 restricts forward escape from igniter 210 of oxygen that comes from pipe 14. This restriction of oxygen's escapes causes flue 39 to fill with oxygen, and thereby accelerates ignition of lance 12. That is, the presence of oxygen in flue 39 will accelerate combustion of outer wall 20, inner wall 22 and mixture 24, thereby supplying more heat to speed the beginning of self-sustaining combustion of lance 12.

I wish it to be understood that I do not desire to be limited to the exact details of construction or method shown herein since obvious modifications will occur to those skilled in the relevant arts without departing from the spirit and scope of the following claims.

What is claimed is:

1. An igniter for an exothermic lance having a pipe and oxygen supplied through the pipe, the igniter comprising:

an inner peripheral wall about the pipe, the inner peripheral wall defining one or more apertures;

a plurality of teeth projecting radially inward from the inner peripheral wall for centering the pipe relative to the inner peripheral wall and holding various pipes of differing diameters the teeth being punch-outs of the inner wall;

an outer peripheral wall about the inner peripheral wall, the outer peripheral wall being thicker than the inner peripheral wall;

a flammable substance between the inner peripheral wall, and the outer peripheral wall, the flammable substance being more rapidly combustible than the inner wall and the outer wall;

means for initiating combustion of the flammable substance.

2. The igniter of claim 1 wherein:

the inner wall defines with an exterior of the pipe a flue along the exterior of the pipe;

the initiating means defines a gap with the pipe, the gap communicating an interior of the pipe to the flue;

whereby oxygen in the pipe enters the flue.

3. The igniter of claim 1 further comprising means for effecting closure of one end of a volume between the inner and outer walls, the effecting means comprised of a zone of the initiating means.

4. The igniter of claim 2 wherein the initiating means contacts the flammable substance.

5. The igniter of claim 1 further comprising means for sealing the initiating means from moisture, the sealing means being a cap interferingly fit to the outer wall and covering the igniting means.

6. An igniter for an exothermic lance having a pipe and oxygen supplied through the pipe, the igniter comprising:

an inner peripheral wall about the pipe and radially spaced therefrom;

teeth punched out from the inner wall and projected radially inward from the inner wall such that the inner wall defines apertures adjacent the teeth;

an outer peripheral wall about the inner peripheral wall, the outer peripheral wall thicker than the inner peripheral wall;

a flammable substance between the inner peripheral wall and the outer peripheral wall, the flammable substance being more rapidly combustible than the inner wall and the outer wall;

means for initiating combustion of the flammable substance, the initiating means closing one end of a volume occupied by the flammable substance and contacting the flammable substance at the one end;

a spacer between the pipe and the initiating means, the spacer creating a gap communicating an interior of the pipe to a space between the pipe and the inner wall.

7. The igniter of claim 6 further comprising a forward wall connected to the inner wall, wherein the spacer is comprised of a pocket formed at the forward wall.

8. The igniter of claim 7 wherein the inner wall, forward wall and pocket are elements of sheet metal integral with one another.

9. An igniter for an exothermic lance, comprising:

an inner cylindrical wall apertures;

teeth punched out from the inner wall and projected radially inward from the inner wall such that the inner wall defines apertures adjacent the teeth;

an outer cylindrical wall about inner peripheral wall, the outer wall thicker than the inner wall;

flanges at the outer peripheral wall at a fore end thereof, the flanges extending radially inwardly;

a flammable substance between the inner wall and the outer wall, the flammable substance being more rapidly combustible than the inner wall and the outer wall;

dual purpose means for initiating combustion of the flammable substance and closing one end of the volume occupied by the flammable substance, the dual purpose means comprised of a match head element multi purpose means for sealing the fore end of the outer wall, sealing the initiation means and preventing striking of the initiation means.

10. The igniter of claim 9 further comprising a spacer projecting axially inward of the igniter from the match head element.

11. The igniter of claim 9 further comprising:

an aperture defined at the aft end of the igniter;

a cover sealed over the aperture, the cover being a thin sheet of brittle, frangible material.

12. The igniter of claim 9 further comprising;

louvers in the outer wall at the fore end of the igniter, the louvers comprised of flanges projecting radially inward of the outer wall and louver openings in the outer wall at the flanges;

a cap covering the match head element and sealingly engaged to the louvers.

* * * * *